「United States Patent [19]

Nagasaki et al.

[11] Patent Number: 4,540,597
[45] Date of Patent: Sep. 10, 1985

[54] PROCESS FOR PRODUCING OPTICAL FIBER FOR OPTICAL TRANSMISSION

[75] Inventors: Shoji Nagasaki; Keiichi Kojima; Keiji Ueno, all of Osaka, Japan

[73] Assignee: Sumitomo Electric Industries, Ltd., Osaka, Japan

[21] Appl. No.: 673,639

[22] Filed: Nov. 21, 1984

[30] Foreign Application Priority Data

Nov. 22, 1983 [JP] Japan .................................. 58-220218

[51] Int. Cl.³ .............................................. B05D 3/06
[52] U.S. Cl. ..................................... 427/44; 427/163; 427/407.3
[58] Field of Search ....................... 427/163, 44, 407.3

[56] References Cited

U.S. PATENT DOCUMENTS 4,388,093  6/1983  Kimura et al. ........................ 427/44

Primary Examiner—Bernard D. Pianalto
Attorney, Agent, or Firm—Sughrue, Mion, Zinn, Macpeak, and Seas

[57] ABSTRACT

A process for producing an optical fiber comprising forming a primary coating layer on a glass fiber, forming a secondary coating layer comprising a polyamide resin or polyester elastomer composition containing a polyfunctional monomer as a crosslinking agent and a lead compound as a radiation-shielding material on the primary coating layer, and crosslinking the secondary coating layer by irradiation with electron rays having a maximum transmittance thickness smaller than the total thickness of the primary and secondary coating layers is disclosed. The resulting optical fiber has excellent heat resistant without causing optical transmission loss.

9 Claims, 3 Drawing Figures

PROCESS FOR PRODUCING OPTICAL FIBER FOR OPTICAL TRANSMISSION

FIELD OF THE INVENTION

This invention relates to a process for producing a heat resistant glass fiber for optical transmission which is free from thermal deformation of a secondary coating layer at high temperatures.

BACKGROUND OF THE INVENTION

Recently, an information transmitting system using a glass fiber for optical transmission (hereinafter referred to as optical fiber) has greatly been developed. Optical fibers are characterized by no fear of short circuit, spark, etc., freedom from electromagnetic disturbances, easiness in lightening or thinning, and the like, as compared with usual electric wires. Therefore, optical fibers have recently been employed in various applications as compared with the conventional electric wires. However, since most of optical fibers which are presently used comprise a glass fiber composed of a core and a cladding, a primary coating layer made of a silicone resin and a secondary coating layer made of a nylon resin as disclosed in, e.g., U.S. Pat. No. 3,980,390, and the secondary coating layer is melted in a high temperature atmosphere, e.g., at 200° C., they cannot withstand use in such high temperature atmosphere.

It is well known that heat resistance of polymers, for example polyethylene, can be improved by chemical crosslinking using organic peroxides or radiation crosslinking to obtain crosslinked polyethylene which does not undergo substantial thermal deformation at temperatures above the melting point of polyethylene. However, when chemical crosslinking is adopted to the secondary coating layer of optical fibers, heating under pressure involved in the chemical crosslinking causes internal distortion and the like, thereby resulting in increase of transmission loss. Therefore, this technique cannot be applied to optical fibers. Further, if the secondary coating layer is crosslinked by irradiation, an increase of transmission loss occurs at a very low radiation dose, e.g., 20 rad, as apparently shown in FIG. 1 wherein $\gamma$ rays are used. Therefore, it appears that radiation having great transmittance, such as $\gamma$ rays, cannot be utilized for crosslinking of the secondary coating layer of optical fibers.

SUMMARY OF THE INVENTION

Accordingly, an object of this invention is to provide a process for producing a heat resistant optical fiber free from thermal distortion in the secondary coating layer thereof at high temperatures.

Another object of this invention is to provide a process for producing a heat resistant optical fiber, wherein a secondary coating layer of the optical fiber can be crosslinked without causing an increase of transmission loss of the fiber.

In the light of the above-described circumstances, the present inventors conducted extensive studies on a process for crosslinking a secondary coatng layer of optical fibers. As a result, it has now been found that the above objects can be achieved by a process for producing an optical fiber, which comprises forming a primary coating layer on an optical fiber, forming a secondary coating layer comprising a polyamide resin or a polyester elastomer composition containing a polyfunctional monomer as a crosslinking agent and a lead compound as a radiation-shielding material on the primary coating layer, and crosslinking the secondary coating layer by irradiating with electron rays having a maximum transmittance thickness smaller than the total thickness of the primary coating layer and the secondary coating layer.

BRIEF DESCRIPTION OF THE DRAWINGS

In FIGS. 2 and 3, the curves (1), (2), and (3) are obtained at accelerating voltages of 400 KeV, 300 KeV, and 250 KeV, respectively.

DETAILED DESCRIPTION OF THE INVENTION

Figure 1:
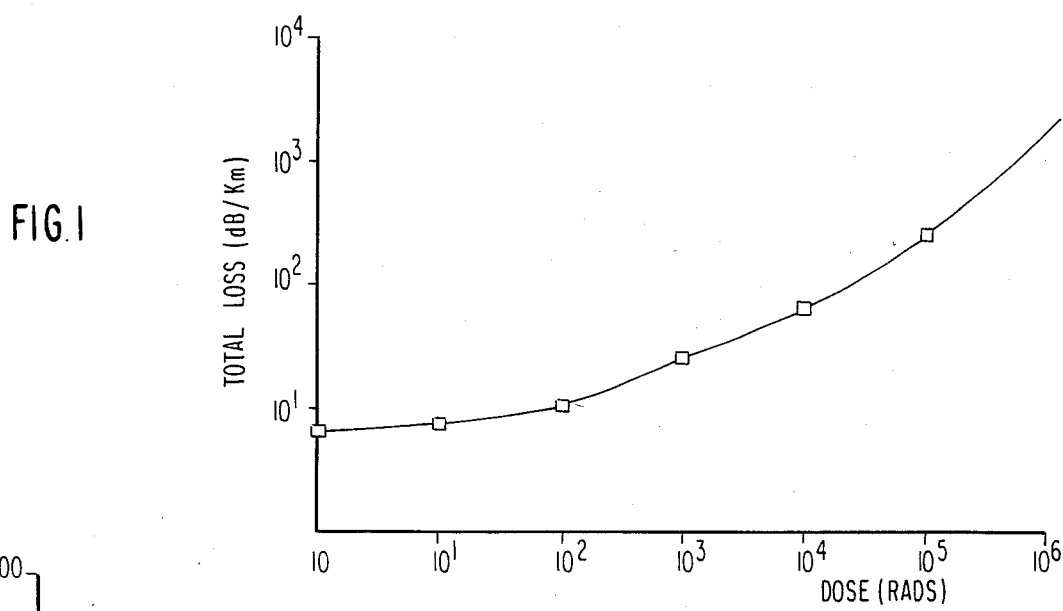
FIG. 1 is a graph showing a relationship between a radiation dose of $\gamma$ rays and a transmission loss of an optical fiber when a secondary coating layer of the optical fiber is crosslinked by irradiation with $\gamma$ rays.

The polyamide resin which can be used as the secondary coating layer in the present invention is preferably a polymer comprising a repeating unit containing from 4 to 23 carbon atoms, such as nylon 6, 66, 610, 612 and 12, with nylon 12 being preferred.

The polyester elastomer which can be used as the secondary coating layer in the present invention has a hard segment having a certain length in its molecular chain and a soft segment in the same molecular chain. The hard segment and the soft segment are typically exemplified by a polyester moiety and a polyether moiety, respectively, and can be represented by the following models:

Soft Segment:

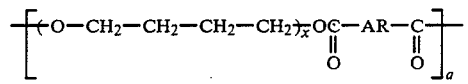

Hard Segment: 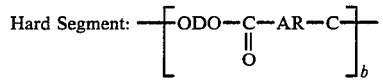

wherein AR represents an aromatic moiety of a dicarboxylate; D represents an alkylene moiety of a diol; x represents a number of ether linkages; and a and b each represents a molar ratio of the respective segment.

The above-described polyamide resins and polyester elastomers can be used for the secondary coating layer because of their satisfactory softness and processability, less causativeness on optical loss due to extrusion-coating, and excellent abrasion resistance.

The polyester elastomer which can be used in the present invention preferably has a Shore hardness of from 25D to 75D. Although a Shore hardness less than 25D is favorable in terms of softness of the resulting optical fiber, the strength is not necessarily sufficient to withstand particularly strong outer forces and, therefore, the range of application of the resulting optical fibers is limited. If a Shore hardness exceeds 75D, softness becomes poor, and the melting point rises as the hardness increases only to lead to evaporation of the crosslinking agent during mixing.

The polyfunctional monomer which can be used as a crosslinking agent in the present invention can be selected from the group consisting of triallyl cyanurate, triallyl isocyanurate, trimethylolpropane trimethacrylate and trimethylolpropane triacrylate. Preferred examples of polyfunctional monomers are triallyl cyanurate, triallyl isocyanurate and trimethylolpropane trimethacrylate in view of their high crosslinking effect.

The amount of the polyfunctional monomer to be added depends on the number of the functional groups present per molecule, but, in general, is at least about 0.1 part by weight, preferably from 0.1 to 30 parts by weight, and more preferably from 0.1 to 15 parts by weight, per 100 parts by weight of the polyamide resin or polyester elastomer.

The lead compound according to the present invention is used as a radiation-shielding material for protecting a quartz core from radiation in order to prevent the increase in transmission loss due to radiation. Such a lead compound can be selcted from the group consisting of lead, lead monoxide, lead trioxide, basic lead carbonate, lead stearate, dibasic lead stearate, tribasic lead maleate, dibasic lead phthalate, lead 2-ethylhexylate, lead salicylate, basic lead cinnamate, tribasic lead sulfate, basic lead sulfite and dibasic lead phosphite and a mixture thereof. Preferred examples of lead compounds are inorganic lead compounds, for example, lead monoxide, tribasic lead sulfate and dibasic lead phosphite since these compounds can be easily mixed in a large amount with the materials for the secondary coating layer and provide a high radiation-shielding effect.

These lead compounds can be used in an amount ranging from about 1 to about 50 parts by weight, preferably from 5 to 50 parts by weight, per 100 parts by weight of the polyamide resin or polyester elastomer. The larger the amount of lead compounds, the higher the radiation-shielding effect, but the use of excessive amounts of lead compound results in difficulty in mixing with resin and molding (coating) and also reduces the mechanical strength of the secondary coating layer. The maximum amount of the lead compound to be used in the secondary coating layer varies depending upon the type of lead compounds used.

According to the present invention, the thickness of each of the primary and secondary coating layers as well as the total thickness of the primary and secondary layers are not limited since the maximum transmittance thickness of electron rays, i.e., electron accelerating voltage can be suitably selected depending upon the total thickness of these layers. Accordingly, the present invention can be applied to optical fibers having primary and secondary coating layers having a thickness normally used in conventional optical fibers. Typical examples of such optical fiber presently used include, for example, (1) an optical fiber having an outer diameter of 0.9 mm comprising a glass fiber having an outer diameter of 125 μm and a silicone resin coating layer provided thereon (coating layer thickness=about 0.39 mm), (2) an optical fiber having an outer diameter of 0.9 mm comprising a glass fiber having an outer diameter of 300 μm and a silicone resin layer provided thereon (coating layer thickness=about 0.3 mm), and (3) an optical fiber having an outer diameter of 3 mm comprising a glass fiber having an outer diameter of 300 μm and a silicone resin coating layer (coating layer thickness=1.35 mm).

Figure 2:
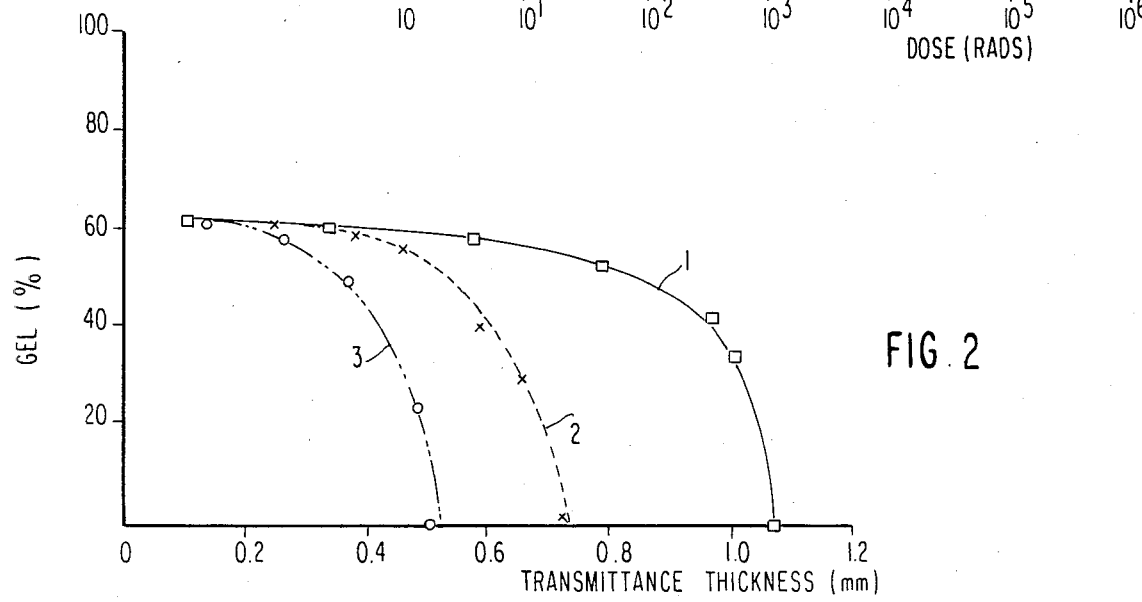
FIG. 2 is a graph showing a relationship between a transmittance thickness of radiation and a gel ratio of a crosslinked polyamide resin, with the accelerating voltage of an electron accelerator being varied.
Figure 3:
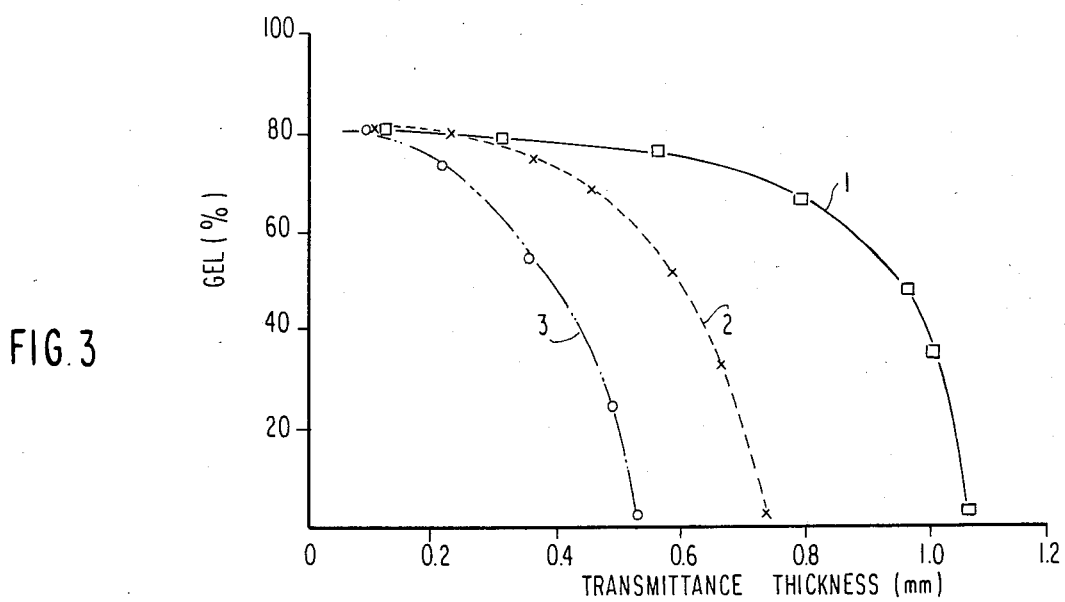
FIG. 3 is a graph showing a relationship between a transmittance thickness of radiation and a gel ratio of a crosslinked polyester elastomer, with the accelerating voltage of an electron accelerator being varied.

In the present invention, the secondary coating layer is irradiated with electron rays having a maximum transmittance thickness smaller than the total thickness of the primary and secondary coating layers, thereby crosslinking the polyamide resin or polyester elastomer. FIG. 2 or 3 illustrates the relationship between an accelerating voltage of an electron accelerator for irradiating the secondary coating layer comprising the polyamide resin composition or the polyester elastomer composition and a gel ratio (content of the solvent-insoluble matter) that represents a degree of crosslinking of the polyamide resin or the polyester elastomer, respectively. In these figures, the curves (1) to (3) indicate accelerating voltages of 400 KeV, 300 KeV and 250 KeV, respectively. Since the total thickness of the primary and secondary coating layers according to the present invention is generally not more than about 0.5 mm, it can be seen from FIG. 2 or 3 that the electron accelerating voltage which can be applied for irradiation of electron rays should be not higher than 250 KeV. However, in the optical fiber provided with the coating layers having a total thickness of 1.35 mm, electron rays at an accelerating voltage of 400 KeV can be irradiated as can be understood from FIGS. 2 and 3. It will be apparent that, when the maximum transmittance thickness is smaller than the total thickness of the coating layers, the inside of the coating layers remains uncrosslinked. It is to be understood that the optical fiber having a secondary coating layer, only the surface of which is crosslinked by radiation, is also within the scope of this invention since such secondary coating layer has crack resistant property.

The dose of electron rays radiation varies depending upon the thickness of coating layers, type of resins used for the coating layers, type and amount of polyfunctional monomer used, etc., but is generally in the range of about 1 to about 50 Mrads.

The glass fiber used in the present invention can be any type of conventional glass fibers. Usually, the glass fiber has a structure of quartz core and cladding, but a glass fiber having no boundary surface between the core and the cladding, i.e., a glass fiber having a refractive index continuously changing in its radius direction, can be used.

The primary coating provided on the glass fiber can be a polyvinyl chloride resin, polyethylene, a silicone resin, a polyurethane resin, nylon, a polyester resin, etc., but a polyester resin and nylon are particularly preferred since these materials show satisfactory adhesion to the secondary coating layer. Other preferred materials for the primary coating layer include a silicone resin.

The present invention will now be illustrated in greater detail by way of the following non-limiting examples. In these examples, a glass fiber having a core/cladding structure was used.

EXAMPLE 1

A quartz fiber composed of a quartz core and a cladding and having a diameter of 125 μm was coated with a silicone resin to a thickness of 150 μm to form a primary coating layer. The fiber was further coated by extrusion with each of Nylon 12 Resin Compositions A to E as indicated in Table 1 to a thickness of 0.35 mm to form a secondary coating layer. Thereafter, the resulting fiber was irradiated with 10 Mrad of electron rays using a low voltage accelerator having an accelerating voltage of 250 KeV to effect crosslinking of the nylon resin of the secondary coating layer. The transmission loss of the resulting optical fiber was found to be 3 dB/Km at wavelengths of 0.6 and 0.8 μm, which is almost equal to that of the conventional non-irradiated optical fibers.

Further, when the optical fibers were allowed to stand in a thermostat at 250° C. for 10 minutes, no melting or cracking occurred and no substantial change was observed in the secondary coating layer in each case as compared with those samples preserved at room temperature.

TABLE 1

| Component | Composition | | | | |
|---|---|---|---|---|---|
| (parts by weight) | A | B | C | D | E |
| Nylon 12* | 100 | 100 | 100 | 100 | 100 |
| Triallyl Cyanurate | 5 | | 5 | | 5 |
| Triallyl Isocyanurate | | 5 | | 5 | |
| Tribasic Lead Sulfate | 5 | 10 | | | |
| Lead Monoxide | | | 20 | | |
| Lead Stearate | | | | 5 | |
| Dibasic Lead Phosphite | | | | | 10 |

Note:
*UBE 3035U, produced by Ube Industries, Ltd.

Optical fibers were also prepared in the same manner as above but using each of nylon 66 (UBE 2026B, produced by Ube Industries, Ltd.), nylon 6 (UBE 1022B produced by Ube Industries, Ltd.) and nylon 610 (LM 2006 produced by Toray Industries, Inc.) in place of nylon 12. The resulting optical fibers showed substantially equal properties to those of the optical fiber obtained above.

EXAMPLE 2

Optical fibers were produced in the same manner as described in Example 1 except that Nylon 12 Resin Composition A to E were replaced by Polyester Elastomer Composition F to J as indicated in Table 2.

The transmission loss of each of the resulting optical fibers was 3 dB/Km at wavelengths of 0.6 μm and 0.8 μm, which is almost equal to that of the conventional non-irradiated optical fibers.

Further, when the optical fibers were allowed to stand in a thermostat at 250° C. for 10 minutes, no melting or cracking occurred and no substantial change was observed in the secondary coating layer in each case as compared with those samples preserved at room temperature.

TABLE 2

| Component | Composition | | | | |
|---|---|---|---|---|---|
| (parts by weight) | F | G | H | I | J |
| Pelprene P70B* | 100 | 100 | 100 | 100 | 100 |
| Triallyl Cyanurate | 5 | | 5 | | 5 |
| Triallyl Isocyanurate | | 5 | | 5 | |
| Tribasic Lead Sulfate | 5 | 10 | | | |
| Lead Monoxide | | | 20 | | |
| Lead Stearate | | | | 5 | |
| Dibasic Lead Phosphite | | | | | 10 |

Note:
*A trade name for a polyester elastomer produced by Toyo Spinning Co., Ltd.; JIS hardness: 96 (Shore hardness: 46D); Melting point: 200° C.; Specific gravity: 1.174.

When the same procedures as described above were repeated but using Pelprene P40B (a trade name for a polyester elastomer produced by Toyo Spinning Co., Ltd.; JIS hardness: 83 (Shore hardness: 40D); Melting point: 170° C.; Specific gravity: 1.070), the results obtained were similar to those obtained above.

COMPARATIVE EXAMPLE 1

Optical fibers were obtained in the same manner as described in Example 1 except that the secondary coating layer was irradiated with 10 Mrad of electron rays at an accelerated voltage of 1 MeV.

The resulting optical fibers were determined for transmission loss at a wavelength of 0.8 μm, and, further, allowed to stand in a thermostat at 250° C. for 10 minutes to observe the changes of the secondary coating layer. As a result, although no particular changes in appearance of the secondary coating layer was observed after preservation at 250° C. for 10 minutes, the transmission loss at 0.8 μm was conspicuously increased to 500 dB/Km as compared with 3 dB/Km as measured in Example 1. This means that the products cannot be used as optical fibers.

On the other hand, optical fibers each having the same structure as in Example 1 but not having been subjected to irradiation were prepared and tested in the same manner as in Example 1. In each case, the non-irradiated optical fiber showed a transmission loss as low as 3 dB/Km at a wavelength of 0.8 μm, but the secondary coating layer was melted upon being allowed in a thermostat at 250° C. for 10 minutes, indicating that the non-irradiated fiber cannot be used as an optical fiber.

COMPARATIVE EXAMPLE 2

An optical fiber was obtained in the same manner as described in Example 1 except that the secondary coating layer was formed by extrusion-coating a resin composition consisting of 100 parts by weight of 12 nylon resin (UBE 3035U, produced by Ube Industries, Ltd.) and 5 parts by weight of triallyl isocyanurate. The transmission loss of the resulting optical fiber determined at a wavelength of 0.8 μm was 3 dB/Km, but that determined at a wavelength of 0.6 μm was found to increase to 50 dB/Km. The increase in transmission loss is assumed to be ascribed to irradiation of secondary X rays generated in the irradiation chamber onto the glass fiber.

COMPARATIVE EXAMPLE 3

An optical fiber was obtained in the same manner as described in Example 1 except that the secondary coating layer ws formed by extrusion-coating a polyester elastomer composition consisting of 100 parts by weight of Pelprene P70B (a trade name for a polyester elastomer produced by Toyo Spinning Co., Ltd,; JIS Hardness: 96 (Shore hardness: D55); Melting point: 200° C.; Specific gravity: 1.174) and 5 parts by weight of triallyl isocyanurate. The transmission loss of the resulting optical fiber determined at a wavelength of 0.8 μm was 3 dB/Km, but that determined at a wavelength of 0.6 μm was found to increase to 50 dB/Km. The increase in transmission loss is assumed to be ascribed to irradiation of secondary X rays generated in the irradiation chamber onto the glass fiber.

As described above, according to the present invention, if the secondary coating layer is heated to a temperature above the melting point of the polyamide resin or polyester elastomer, the shape of the optical fiber can be retained and no increase in transmission loss occurs.

While the invention has been described in detail and with reference to specific embodiments thereof, it will be apparent to one skilled in the art that various changes and modifications can be made therein without departing from the spirit and scope thereof.

What is claimed is:

1. A process for producing an optical fiber for optical transmission, which comprises forming a primary coating layer on a glass fiber, forming a secondary coating layer comprising a polyamide resin composition or polyester elastomer composition containing a polyfunctional monomer and a lead compound on the primary coating layer, and crosslinking the secondary coating layer by irradiation with electron rays having a maximum transmittance thickness smaller than the total thickness of the primary coating layer and the secondary coating layer.

2. A process as claimed in claim 1, wherein the polyamide resin is a polymer comprising a repeating unit containing from 4 to 23 carbon atoms.

3. A process as claimed in claim 2, wherein the polyamide resin is nylon 12.

4. A process as claimed in claim 1, wherein the polyester elastomer has a Shore hardness of from 25D to 75D.

5. A process as claimed in claim 1, wherein the polyfunctional monomer is selected from the group consisting of triallyl cyanurate, triallyl isocyanurate, trimethylolpropane trimethacrylate, and trimethylolpropane triacrylate.

6. A process as claimed in claim 1, wherein the lead compound is selected from the group consisting of lead, lead monoxide, lead trioxide, basic lead carbonate, lead stearate, dibasic lead stearate, tribasic lead maleate, dibasic lead phthalate, lead 2-ethylhexylate, lead salicylate, basic lead cinnamate, tribasic lead sulfate, basic lead sulfite and dibasic lead phosphite.

7. A process as claimed in claim 1, wherein the polyfunctional monomer is present in an amount of 0.1 to 30 parts by weight per 100 parts by weight of the polyamide resin or polyester elastomer.

8. A process as claimed in claim 1, wherein the lead compound is present in an amount of from about 1 to about 50 parts by weight per 100 parts by weight of the polyamide resin or polyester elastomer.

9. A process as claimed in claim 8, wherein the lead compound is present in an amount of from 5 to 50 parts by weight per 100 parts by weight of the polyamide resin or polyester elastomer.

* * * * *